H. F. SMITH.
SPEED REGULATION.
APPLICATION FILED MAR. 8, 1920.
1,381,513.
Patented June 14, 1921.
2 SHEETS—SHEET 1.
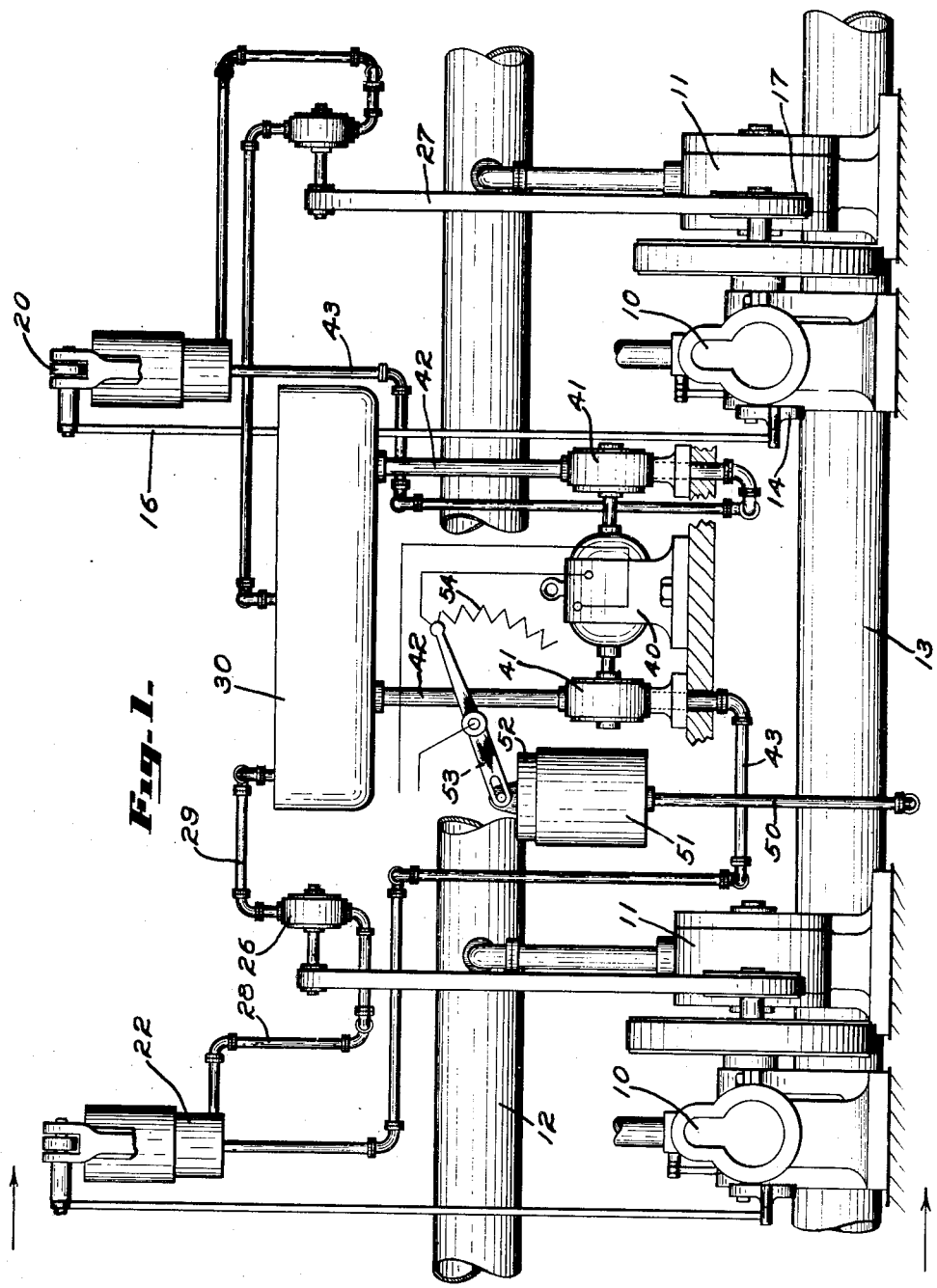
Witnesses
Chas. G. Graef.
Edwin James.
Inventor
Harry F. Smith
By Kerr, Page, Cooper & Hayward
Attorneys

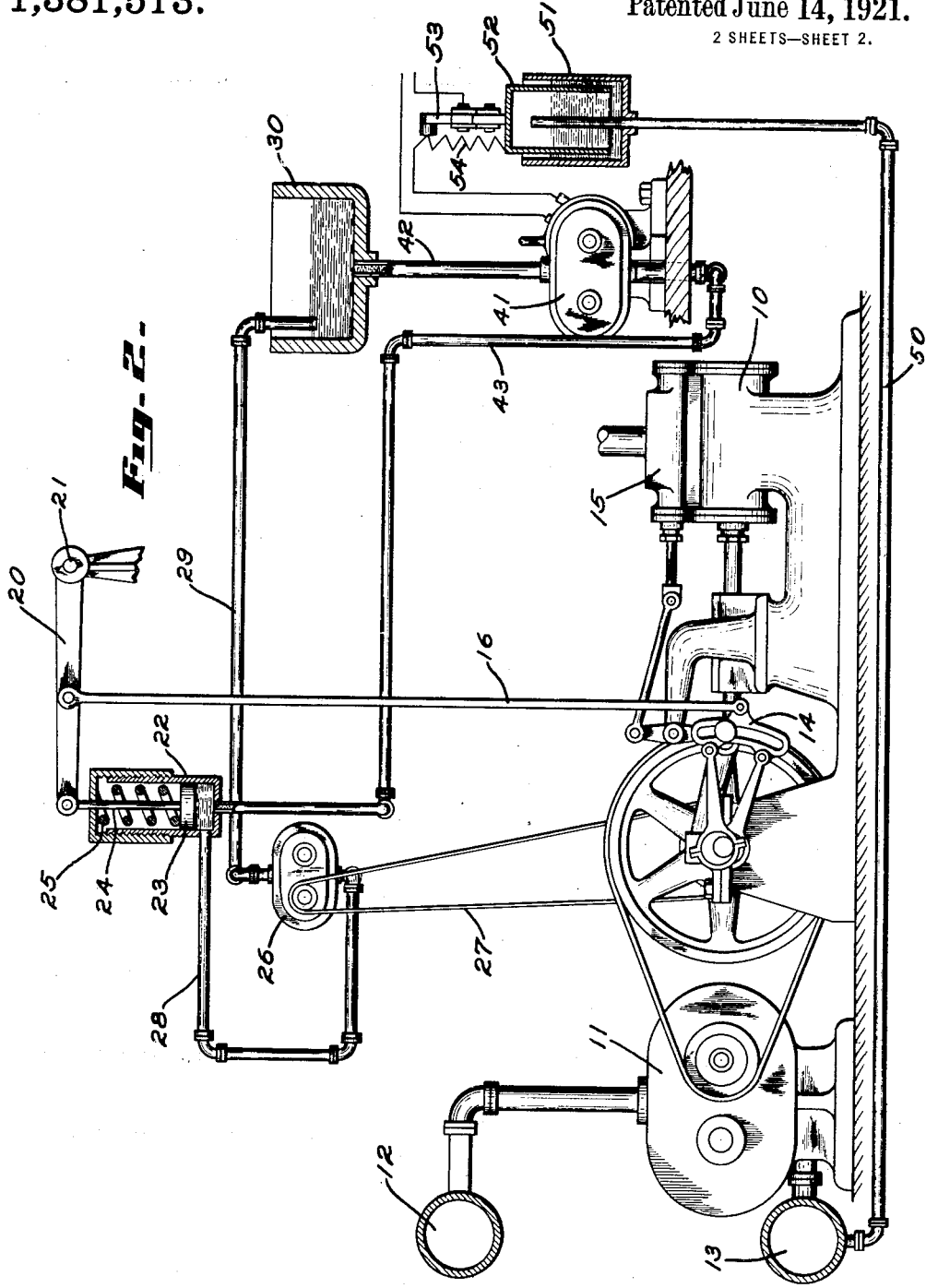

UNITED STATES PATENT OFFICE.

HARRY F. SMITH, OF DAYTON, OHIO, ASSIGNOR, BY MESNE ASSIGNMENTS, TO THE GAS RESEARCH COMPANY, OF DAYTON, OHIO, A CORPORATION OF OHIO.

SPEED REGULATION.

1,381,513.  Specification of Letters Patent.  Patented June 14, 1921.

Application filed March 8, 1920. Serial No. 364,213.

*To all whom it may concern:*

Be it known that I, HARRY F. SMITH, a citizen of the United States of America, residing at Dayton, county of Montgomery, State of Ohio, have invented certain new and useful Improvements in Speed Regulation, of which the following is a full, clear, and exact description.

This invention relates to a system for regulating or governing prime movers, and more particularly to a system for controlling a plurality of prime movers to insure uniform operation thereof.

One object of the invention is to provide a system of regulation for controlling a plurality of prime movers adapted to control the speed of operation of each prime mover individually and to uniformly control the speed of operation of all the prime movers in unison.

Another object is to provide a system of regulation whereby the speed of operation of a plurality of prime movers is so controlled as to limit the maximum and minimum speed of operation of each prime mover individually and of all the prime movers in unison.

Other objects and advantages will be apparent from the description below when taken in connection with the accompanying drawing.

For purpose of clearer description I have illustrated my regulating system as connected with a plurality of prime movers adapted for driving a plurality of pumps, the apparatus shown forming part of a gas producer system, the function of the pumps being to draw gas from the generating chamber of the producer and force it into the delivery main. It is obvious that my system of engine speed control is by no means limited to this specific application inasmuch as it will function equally as well in many other adaptations.

In systems for delivering liquids or gases under pressure it is quite common to employ a plurality of pumps for forcing the liquid or gas from a source of supply into the delivery main. In such systems it is desirable that each pump deliver the same quantity of liquid or gas to the main. Especially is this true where the pumps are functioning as exhausters for a multi-unit gas producer system, or other analogous apparatus. In systems of this character it is particularly desirable that each unit thereof furnish a proportional part of the gas supplied to the main, that is that each unit carry a proportional part of the entire load, and the most desirable way of securing this condition is to so govern the several pumps or exhausters that each will operate at a definite rate of speed. In order to maintain the pressure within the delivery main constant, under varying load conditions, it is essential that the speed of all the pumps collectively, and consequently the quantity of gas delivered by them, be regulated to accord with the existing pressure conditions. In other words, so long as pressure conditions within the main remain constant, it is desirable that each of the pumps be maintained at a uniform speed of operation, regardless of variations in the local conditions affecting any particular pump, and, upon variation of pressure conditions within the main, that all of the pumps collectively be driven at a changed speed which is dependent upon conditions existent within the main. Each of the pumps in a system of this sort is driven by a prime mover of some sort, generally a steam engine, and in order to insure uniform speed of such pumps it is merely necessary that the driving engine be properly regulated. A related system of engine speed control is shown in my co-pending application filed October 1, 1917, Serial No. 194,165.

In the regulation of prime movers operating exhausters, in a gas producing system, the regulating mechanism must be adapted not only for controlling all of the prime movers collectively and each unit thereof separately, but must also be adapted to prevent any variation of operating speed, of any prime mover, in either direction beyond the predetermined minimum and maximum. It has been found, where the prime mover is, for instance, a steam engine, that if for any reason any one of the prime movers slows down below a certain minimum speed, such prime mover will "stall" or stop. Immediately the gas will back up in the ashpit below the grate of the producer and cause dangerous explosions. Furthermore, the gas in the main being under pressure will cause the exhauster to function as a motor and reverse the driving engine. As a result, gas will be pumped from the main by this particular pump, back into the generator chamber of the producer, thus further increasing the danger from explosion within the producer. This condition will also cause a decrease of pressure in the main, the effect of which will be to cause the other engines to speed up in an endeavor to bring the pressure back to the desired pressure condition. If the decrease in pressure is substantial, as it would be under the conditions stated, the other engines will tend to race at a dangerous speed. And of course there might readily arise other conditions resulting in such low pressures within the delivery main as to cause undesirable racing of the engines. It is therefore, evidently necessary that the regulating mechanism be so arranged that none of the prime movers may fall below a definite minimum, or exceed a maximum, speed of operation.

In the drawing in which like characters of reference designate like parts,

Figure 1 is a view in elevation showing improved regulating mechanism applied to a plurality of steam engines, each of which is arranged for driving a gas exhauster; and Fig. 2 is a view at right angles to Fig. 1, looking in the direction of the arrows, with parts of the structure shown in section to more clearly disclose the mechanical details thereof.

In the drawing, 10 designates a plurality of steam engines adapted for driving the exhauster pumps 11. Each of these exhausters is a constant displacement gear pump, and, when driven by its associated engine 10, withdraws gas from the main 12 and forces this gas into the delivery main 13, the pressure within the main being dependent upon the quantity of gas delivered thereto by the exhauster and the quantity removed therefrom to take care of the load. The capacity of each exhauster at any definite speed is, of course, constant, and variations in the amount of gas pumped by each exhauster can be secured by varying its speed of operation. Obviously this speed of operation must agree with the speed of the driving engine. Associated with each of the engines 10 is a link mechanism 14 adapted for controlling the speed of operation of the engine by varying the cut-off of the distributing valve 15. Connected to the link mechanism 14 is a rod 16.

Located above each engine is a lever 20, one end of which is fulcrumed to any desired part of the mechanism, as shown generally at 21, the upper end of the rod 16 being pivotally attached to this lever intermediate its ends. Also located above each prime mover, and adjacent the free end of the lever 20, is a cylinder 22 having a piston 23 therein, the rod 24 of such piston being attached at its outer free end to the free end of the lever 20. Located within the cylinder 22 is a spring 25, so positioned with relation to the piston 23 that it tends to urge this piston in such direction as to force or swing the lever 20 downwardly around its pivot 21, and to, through the medium of the rod 16, move the link mechanism to cause shorter opening of the distributer valve and consequent slowing down of the engine. Also located adjacent each engine is a positive gear pump 26, driven from the engine with which it is associated, in any desired manner, as by means of a belt 27 which passes over the pulley 17 carried upon the engine shaft. Leading off from the bottom of the cylinder 22, below the piston 23, is a pipe 28 which constitutes the inlet pipe for the pump 26. Leading off from the delivery side of the pump 26 is a pipe 29, constituting the outlet pipe of the pump which discharges into a tank 30, adapted to act as a storage vessel for the liquid used in the controlling mechanism; the liquid generally used being oil.

Located in any suitable place is a prime mover 40. As shown such prime mover consists of an electric motor; but any other desired type of prime mover may be used. The motor 40 has its shaft extended on both sides, and each end of this shaft carries thereon one of the rotor elements of a positive displacement pump 41. In the apparatus illustrated there are two of these pumps driven by the motor 40, and it is to be understood that there should be one of these pumps for each of the main prime movers 10. It is to be further expressly borne in mind that all of these pumps must be driven from the same shaft, or from some power source which will insure a uniform rate of operation of all of the pumps. Leading into the inlet side of the casing of each pump is a pipe 42, the other end of which opens into the tank 30, each of these pipes constituting the inlet pipe for the pump with which it is associated. Leading off from the casing of each of the pumps 41 is an outlet pipe 43 the opposite end of which opens into the lower end of the cylinder 22 associated with the particular pump. Operation of the pumps 41 will tend to draw oil from the tank 30 and force it into the cylinder 22 below the piston 23. This will tend to force the piston 23 upwardly against the action of the spring and cause variation in the setting of the link mechanism with a corresponding variation in the cut-off of the distributing valve coöperating therewith to vary the speed of operation of the engine controlled by said valve. Inasmuch as all of the pumps 41 are driven at a uniform rate of speed, and are of the same displacement, it is obvious that these pumps during operation will tend to vary the setting of the various link mechanisms uniformly. The pumps 26 are adapted to draw oil from the cylinder 22 and force this oil into the tank 30. To secure any desired speed of operation of any particular prime mover, therefore, it is merely necessary that the speed of operation of the pumps 41 and 26 associated with the specific prime mover, be so coordinated or balanced that the desired quantity of oil be maintained within the cylinder 22. This must of necessity result in the desired setting of the link mechanism.

Presuming that the motor driving the pumps 41 is maintained at a constant speed of operation, it is obvious that the prime movers 10 may be maintained at any desired speed of operation; for the quantity of oil delivered to the cylinder 22 by the pump 41 will remain constant while the quantity of oil pumped from the cylinder 22 will vary as the speed of the prime mover tends to increase or decrease. Obviously, if the speed of the prime mover increases so that the speed of the pump 26 relative to the coöperating pump 41 increases, the quantity of oil within the cylinder 22 will decrease and this will allow movement of the piston and its coöperating elements to vary the cut-off of the distributing valve associated therewith to return the engine to predetermined speed. And obviously, any decrease in speed of operation of the engine will result in an increased quantity of oil within the cylinder 22 and causes such variation in the cut-off of the distributing valve as will increase the speed of operation of the prime mover to return it to the desired predetermined speed.

Leading off from the delivery main 13 is a pipe 50 which opens into the lower bell of a gasometer 51. Pivotally attached to the upper bell 52 of the gasometer is a lever 53, the free end of which coöperates with a resistance 54, so that as the upper bell of the gasometer rises or falls, the speed of operation of the motor 40 with which the resistance 54 is associated, will be varied. This gasometer and coöperating resistance are so arranged that as the pressure within the main 13 increases, the speed of operation of the motor will decrease. Of course with another type of prime mover for driving the pumps 41 other speed control mechanism would be used in place of the variable resistance 54.

From the above it is obvious that this device is adapted to control the speed of operation of each prime mover individually and of all the prime movers in unison. If pressure conditions remain constant within the delivery main 13, or because of local conditions, the speed of operation of any prime mover tends to vary so that the output of its corresponding pump or exhauster 11 is either increased or decreased, it is obvious that the pump 26 associated with such prime mover will have its speed of operation correspondingly increased or decreased to vary the quantity of oil within the cylinder 22 and to thus cause actuation of the link mechanism to vary the speed of the prime mover and to return it to a speed of operation which is in accord with the speed of operation of the other prime movers. If pressure conditions within the gas main should vary, as would be the case where a part of the load is dropped, it would immediately become necessary to vary the speed of operation of all the prime movers to secure the gas output necessary under the changed pressure conditions. That is in normal operation it is desirable that the pressure within the delivery main shall be maintained constant regardless of variation in load. In producer practice it is further desirable that the quantity of gas delivered by the generators be varied to accord with the demand, or load. Obviously then if a part of the load is dropped it would become necessary to decrease the speed of operation of the exhausters in order to maintain the desired conditions. And if the load is increased, it would, just as obviously, become necessary to correspondingly increase the speed of operation of the exhausters in order to maintain the desired conditions. If the pressure conditions within the main vary, therefore, there will be an immediate rise or fall of the upper bell of the gasometer 51 with a corresponding movement of the lever 53 to vary the resistance 54 and to thus increase or decrease the speed of operation of the motor 40. Any variation in speed of operation of the motor 40 will cause a corresponding and uniform variation in the speed of operation of all the pumps 41, and this will in turn so vary the quantity of oil within the cylinder 22 as to cause a variation in the positioning of all the link mechanisms with a corresponding variation in the speed of operation of all the prime movers. And inasmuch as the variation in the speed of operation of the pumps 41 is the same for all the pumps, it is clear that the speed of operation of all the prime movers will be uniformly varied, and that such variations in operating conditions will take place in unison.

The resistance 54 is so arranged that a definite maximum and minimum speed of operation of the motor 40 is provided for. With such definite maximum and minimum speed of operation it is obvious that the speed of operation of any prime mover may not exceed or fall below definite predetermined limits.

I have found that different prime movers, which are apparently identical in structure, will have different inherent governing characteristics which make them behave differently under the same conditions of cut-off. In order to secure uniform speed of operation of a plurality of prime movers having such different governing characteristics it is necessary to provide a control for the governing mechanism which is capable of varying those governing mechanisms to secure like variations in the speed of operation of all of the prime movers even though each governing mechanism must be differently varied. If, for instance, a plurality of engines having conventional governing mechanism associated therewith are used, it will be found that corresponding variations in the setting of the governors may not result in corresponding variation in the speed of operation of the various engines. That is to say, if a plurality of engines have a single means associated with their various governing mechanisms, which means is adapted to vary the setting of all of the governing mechanisms a corresponding amount, such variation in the setting of the governing mechanisms may not result in a uniform variation in the speed of operation of all the prime movers. The controlling mechanism which I have described will result in such variation in the setting of the various governing mechanisms as will cause a corresponding variation in the speed of operation of each of the engines regardless of the inherent governing characteristics of each particular engine.

While the form of mechanism herein shown and described constitutes a preferred form of embodiment of the invention, it is to be understood that other forms might be adopted, all coming within the scope of the claims which follow.

What I claim is as follows:

1. A speed regulating mechanism for a plurality of prime movers; comprising in combination governing means for each prime mover, said means being actuated by the prime mover with which it is associated; and a coöperating governing means for each prime mover, all such coöperating means being actuated by an independent and common power source; the sets of governing means being adapted when operating in coöperative relation to control the speed of each prime mover individually and of all the prime movers in unison.

2. A speed regulating device for a plurality of prime movers; comprising in combination governing mechanism for each prime mover, including governing means operated by each prime mover; and a separately operated means for each prime mover coöperating with the first named governing means, said separately operated means being all driven from a common and independent power source, the two said means when operating in coöperative relation being adapted to control the speed of each prime mover separately and all of the prime movers in unison.

3. A speed regulating mechanism for a plurality of prime movers; comprising in combination a pressure operated governing mechanism for each prime mover, including means operated by each prime mover and adapted to vary the pressure operating the corresponding governing mechanism in accordance with variations in the speed of operation of the prime mover; and a coöperating means for each prime mover, also adapted to vary the pressure operating the governing mechanism, all such means being actuated by a common and independent power source; the operation of the two said pressure varying means being so balanced as to control the speed of each prime mover separately and of all the prime movers in unison.

4. A speed regulating mechanism for a plurality of prime movers; comprising in combination a pressure operated governing mechanism for each prime mover; a pump driven by each prime mover and tending to vary the pressure operating the corresponding governing mechanism in accordance with variations in the speed of operation of such prime mover; and a separately operated pump for each prime mover also tending to vary the pressure operating each governing mechanism, all such separately operated pumps being actuated by a common and independent power source; the relative operation of the two sets of pressure varying pumps being such that the resultant pressure operating each governing mechanism will tend to control the speed of operation of each separate prime mover individually, and the speed of operation of all the prime movers in unison.

5. A speed regulating mechanism for a plurality of prime movers; comprising in combination a pressure operated governing mechanism for each prime mover; means associated with each prime mover tending to vary the operating pressure of all the governing mechanisms in unison, said means being all driven at a uniform rate from an independent and common power source; and separate means operated by each prime mover, each such separate means tending to vary the operating pressure of its coöperating pressure operated governing mechanism according to the speed of operation of the prime mover by which it is driven.

6. A speed regulating mechanism for a plurality of prime movers; comprising in combination means adapted to automatically control the speed of operation of each separate prime mover, each such means being actuated by the prime mover which it is adapted to control, and other means coöperating with said first named means, each of said second named means being driven from an independent and common power source; the two said means when operating in coöperative relation being adapted to maintain each prime mover at the same speed of operation as the other prime movers and to vary the speed of operation of all the prime movers in unison.

7. A regulating device for pumps; comprising in combination, a plurality of pumps; a prime mover for driving each pump; a governing means for each prime mover, said means being actuated by the prime mover with which it is associated; a governing means for each prime mover adapted to coöperate with said first named means, said second named means being all actuated from a common and independent power source; each set of coöperating means being adapted to control the speed of operation of each prime mover independently and of all the prime movers in unison.

8. A speed regulating mechanism for a plurality of prime movers; comprising in combination a governing mechanism for each prime mover, said mechanism being driven by the prime mover with which it is associated; and a separate coöperating governing mechanism for each prime mover, said coöperating mechanism being driven from a common and independent power source; the sets of governing mechanisms being adapted to coöperate during operation of the prime movers to control the speed of operation of each prime mover separately and the speed of operation of all the prime movers in unison.

9. In a system for conveying fluids, in combination, a plurality of pumps adapted to deliver the fluid to the conveying main; a prime mover for driving each pump; a governor for each prime mover, said governor being actuated by the prime mover with which it is associated; a coöperating governor for each prime mover, all said coöperating governors being driven from an independent and common power source; the sets of coöperating governors being adapted to control the speed of operation of each prime mover individually and to control the speed of operation of all the prime movers in unison in accordance with variations in pressure within the conveying main.

10. Speed control mechanism comprising in combination, a plurality of pumps; prime movers for driving the pumps; pressure operated governing mechanism associated with each prime mover; means actuated by each prime mover and adapted for varying the operating pressure of said governing mechanism according to variations in the speed of operation of such prime mover; and a plurality of means actuated from an independent and common power source, each means adapted for varying the operating pressure of one of said governing means; the two said means being coöperatively associated and adapted during coöperation to control the speed of operation of each prime mover individually and the speed of operation of all the prime movers in unison.

In testimony whereof I affix my signature.

HARRY F. SMITH.

Witnesses:
CHAS. G. GRAEF,
EDWIN JAMES.